US012560951B2

(12) United States Patent
Cayer et al.

(10) Patent No.: US 12,560,951 B2
(45) Date of Patent: Feb. 24, 2026

(54) SMART MANUFACTURING SOLUTIONS FOR WASTEWATER TREATMENT

(71) Applicant: Applied Materials, Inc., Santa Clara, CA (US)

(72) Inventors: Maxime Cayer, Chandler, AZ (US); John L Koenig, Cedar Park, TX (US); Tony H. Tong, Dublin, CA (US); Shaun W. Crawford, Santa Clara, CA (US); James L'Heureux, Santa Clara, CA (US); Andreas Neuber, Stuttgart (DE); Ching-Hong Hsieh, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 650 days.

(21) Appl. No.: 17/901,670

(22) Filed: Sep. 1, 2022

(65) Prior Publication Data

US 2024/0077890 A1 Mar. 7, 2024

(51) Int. Cl.
    *G06F 3/048*     (2013.01)
    *B24B 37/005*     (2012.01)
    (Continued)

(52) U.S. Cl.
    CPC ......... *G05D 7/0652* (2013.01); *B24B 37/005* (2013.01); *B24B 37/34* (2013.01);
    (Continued)

(58) Field of Classification Search
    CPC ................ G05D 7/0652; B24B 37/005; B24B 37/0056; B24B 37/34; B24B 37/044;
    (Continued)

(56) References Cited

U.S. PATENT DOCUMENTS 7,522,974 B2    4/2009    Loldj et al.
2001/0034190 A1    10/2001    Tanikawa et al.
(Continued)

FOREIGN PATENT DOCUMENTS

CN      205668203 U    11/2016
JP      2000286224 A    10/2000

OTHER PUBLICATIONS

International Search Report and Written Opinion for Application No. PCT/US2023/028082 dated Nov. 7, 2023.

*Primary Examiner* — Aleksey Olshannikov
(74) *Attorney, Agent, or Firm* — Patterson + Sheridan, LLP

(57) ABSTRACT

The present disclosure generally relates to methods and system used to collect waste fluids. A system controller is disclosed to control the operation of at least a portion of the system. The controller has a CPU. The fabrication facility includes a first processing system having fluid dispensed therein for processing a material on a part. A first drain is configured to collect the processing fluid as waste fluid after processing the part. The fabrication facility also includes a waste collection system fluidly coupled to the system drain. The waste collection system has two or more valves configured to couple the system drain and two or more facility drains. Each facility drain is uniquely coupled to one of the two or more valves. The CPU is configured to operate the valves between an open and a closed state in response to the fluid entering the system drain.

17 Claims, 4 Drawing Sheets

(51) Int. Cl.

| | |
|---|---|
| *B24B 37/34* | (2012.01) |
| *G05B 19/4155* | (2006.01) |
| *G05D 7/06* | (2006.01) |
| *B24B 55/12* | (2006.01) |

(52) U.S. Cl.
CPC .......... *G05B 19/4155* (2013.01); *B24B 55/12* (2013.01); *G05B 2219/37371* (2013.01)

(58) Field of Classification Search
CPC . B24B 55/12; H01L 21/30625; H01L 21/302; H01L 21/67023; H01L 21/67092; H01L 21/67017

See application file for complete search history.

(56) References Cited

U.S. PATENT DOCUMENTS

| | | | |
|---|---|---|---|
| 2007/0256704 | A1 | 11/2007 | Porshnev et al. |
| 2007/0260343 | A1 | 11/2007 | Raoux et al. |
| 2009/0175771 | A1 | 7/2009 | Tsai et al. |
| 2009/0222128 | A1 | 9/2009 | Clark et al. |
| 2011/0056913 | A1* | 3/2011 | Mayer ....................... C25C 7/00 |
| | | | 216/84 |
| 2017/0229323 | A1* | 8/2017 | Watanabe ............... B24B 57/02 |
| 2022/0193863 | A1 | 6/2022 | Sun et al. |

* cited by examiner

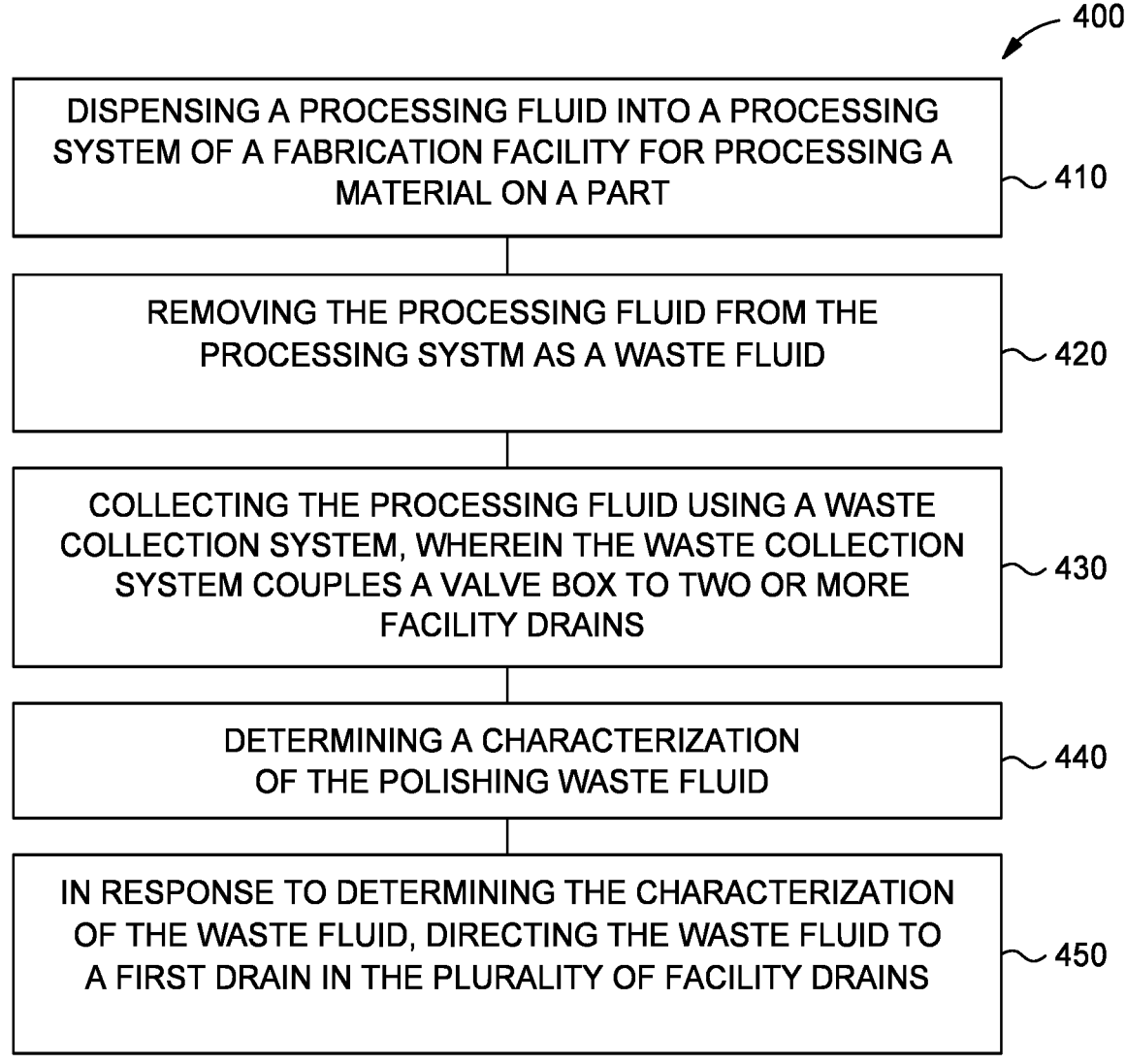

400

DISPENSING A PROCESSING FLUID INTO A PROCESSING SYSTEM OF A FABRICATION FACILITY FOR PROCESSING A MATERIAL ON A PART ∼ 410

REMOVING THE PROCESSING FLUID FROM THE PROCESSING SYSTM AS A WASTE FLUID ∼ 420

COLLECTING THE PROCESSING FLUID USING A WASTE COLLECTION SYSTEM, WHEREIN THE WASTE COLLECTION SYSTEM COUPLES A VALVE BOX TO TWO OR MORE FACILITY DRAINS ∼ 430

DETERMINING A CHARACTERIZATION OF THE POLISHING WASTE FLUID ∼ 440

IN RESPONSE TO DETERMINING THE CHARACTERIZATION OF THE WASTE FLUID, DIRECTING THE WASTE FLUID TO A FIRST DRAIN IN THE PLURALITY OF FACILITY DRAINS ∼ 450

FIG. 4

SMART MANUFACTURING SOLUTIONS FOR WASTEWATER TREATMENT

BACKGROUND

Field

Embodiments described herein generally relate to systems and methods used to process semiconductor substrates in an electronic device manufacturing process, and more particularly, to systems for collecting wastewater and waste fluids used in the manufacture of a semiconductor substrate.

Description of the Related Art

Fabrication facilities utilize processing systems in the manufacturing of high-density integrated circuits, e.g., semiconductor devices. For example, a chemical mechanical planarization system is one processing system used to manufacture semiconductor devices. The CMP system planarize or polish a layer of material deposited on a substrate. A typical CMP process includes contacting the material layer of the substrate to be planarized with a polishing pad in the presence of a polishing fluid and moving the polishing pad, the substrate, or both, hence creating relative movement between the material layer surface and the polishing pad. Material is removed across the material layer surface in contact with the polishing pad through a combination of chemical and mechanical activity, which is provided at least in part by the polishing fluid. Commonly used polishing fluids include abrasive particle-containing slurries, e.g., colloids or suspensions, reactive liquid (abrasive-free) slurries, and abrasive-free or reduced-abrasive polishing fluids used in conjunction with fixed-abrasive polishing pads having abrasive particles disposed therein.

Typically, polishing fluids are highly engineered to provide desired chemical and mechanical polishing performance characteristics, and to disperse and keep the abrasive particles in a colloid or a relatively stable suspension. Not all polishing fluids used during CMP require the same treatment or even any treatment when the polishing fluid is used and is collected as waste. Some polishing fluids contain metals and other materials such that after their use, the waste polishing fluid requires treatment while others can be recycled, reused or disposed of without treatment. When the fluids are collected after polishing, the collected fluids are treated together to remove the most of the hazardous waste. However, treating the waste fluid this way is expensive. The waste fluid problem is not unique to only CMP systems at fabrication facilities.

Accordingly, there is a need in the art of semiconductor device manufacturing for improved handling of waste fluids, and methods for operating the same.

SUMMARY

The present disclosure generally relates to methods and system used to collect waste fluids. A system controller is disclosed to control the operation of at least a portion of a fabrication facility. The controller has a CPU. The fabrication facility includes a first processing system having fluid dispensed therein for processing a material on a part. A first drain is configured to collect the processing fluid as waste fluid after processing the part. The fabrication facility also includes a waste collection system fluidly coupled to the system drain. The waste collection system has two or more valves configured to couple the system drain and two or more facility drains. Each facility drain is uniquely coupled to one of the two or more valves. The CPU is configured to operate the valves between an open and a closed state in response to the fluid entering the system drain.

In another embodiment, a method of collecting a waste fluid is disclosed. The method includes dispensing a processing fluid into a processing system of the fabrication facility in accordance to a processing recipe for processing a material on a part. The processing fluid is removed from the processing system as a waste fluid. The waste fluid is collected using a waste collection system, wherein the waste collection system couples a valve box to two or more facility drains. The fluid waste is characterized. In response to determining the characterization of the fluid waste, the waste fluid is directed to a first valve in the valve box coupled to a first drain.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a flow diagram setting forth a method of collecting waste fluid from a portion of a fabrication facility.

Figure 1:
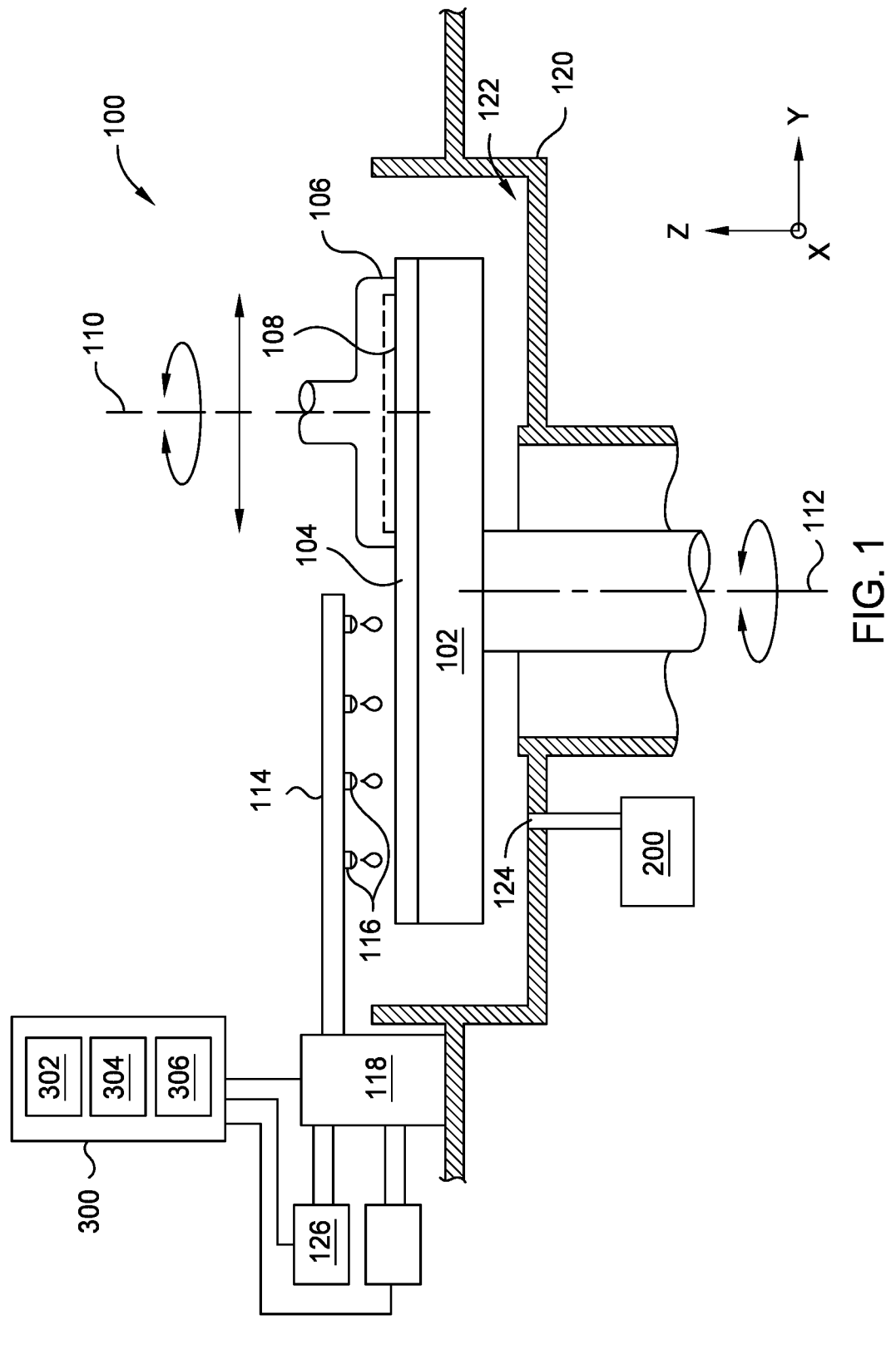
FIG. 1 is a schematic side view of a processing system configured with multiple drains for selectively removing spent fluid, according to embodiments.

In order to facilitate understanding, identical reference numerals have been used where possible to designate identical elements that are common to the figures. It is contemplated that the elements and features of each embodiment may be beneficially incorporated into the other embodiments without further recitation.

DETAILED DESCRIPTION

Embodiments of the present disclosure generally provide a system for controlling the collection of waste fluids from processing systems fabricating an electronic device manufacturing process.

For example, a processing system may be a chemical mechanical polishing (CMP) system. The CMP dispenses polishing fluid onto a surface of a polishing pad mounted on a rotating platen. A substrate is urged against the polishing pad in the presence of the polishing fluid. The dispensed polishing fluid is distributed radially outward from the dispense location by the centrifugal force imparted to the polishing fluid from the rotation of the platen. When the polishing fluid reaches the circumferential edge of the polishing pad, the polishing fluid typically flows into a drainage basin that surrounds the platen and extends into a region disposed below the platen. This facilitates capture of all of the fluids and other processing byproducts during the CMP process and other processing activities concomitant wherewith, e.g., pad rinsing and pad conditioning activities, as well as polishing byproducts related thereto.

Provided herein is a cost effective solution to allow waste drain switching based on waste characteristics of the spent polishing fluid, even when the waste fluid includes one or more of copper, ozone, suspended solids, fluoride, toxins (such as GaAs), among others. Drain switching enables drain material protection as well as cost effective control of subfab components and abatement (water flows, neutralization) of the waste polishing fluids. Data management of the switching system enables an estimation of the waste composition and the balancing of materials used by the processing systems and waste collection systems. The waste drains are segregated based on the characterization of the waste fluid. For example, the waste drains may be segregated to allow compliant treatment into caustic and acidic drains having arsenic (As) and those without As respectively. The drains may further be segregated based on other metals or other contaminants requiring specific treatment/abatement. Thus, the in a cost reduction for the treatment of the waste polishing fluid waste, enables compliance reporting on specific wastes, and reduces the overall system operation costs. It should be appreciated that any processing system having wet applications may benefit from the disclosure below. For example, resist clean, other cleans and wet etches, to name a few, all require the capture of waste fluids and the disposal, recycling, treatment and reporting thereof. Thus, the system disclosed, can be rolled out beyond etch, CVD, PVD, EPI cleans, CMP and plating for data collection and health monitoring.

FIG. 1 is a schematic side view of a processing system configured with multiple drains for selectively removing spent fluid. The processing system is part of a fabrication facility. The fabrication facility has a plurality of processing systems which may perform operations for fabricating various parts from a variety of materials. Although the processing system may be any one of a variety of processing systems as discussed above, the discussion will be confined to a CMP system 100 for the sake of brevity.

The CMP 100 includes a cylindrical platen 102, a polishing pad 104 secured to the platen, a substrate carrier 106, and a catch basin 122. The polishing pad 104 may be secured to the platen 102 using a pressure-sensitive adhesive or other releasable technique. The substrate carrier 106 disposed above the platen 102 such that substrates disposed in the carrier 106 face the polishing pad 104. The catch basin 122 is used to collect and recycle polishing fluid from a polishing process performed on the CMP 100. During a chemical mechanical processing, the substrate carrier 106 urges a material surface of a substrate 108 disposed in the substrate carrier 106 against the polishing pad 104, while simultaneously rotating about a carrier axis 110. The platen 102 rotates about a platen axis 112 while the rotating substrate carrier 106 sweeps back and forth from an inner diameter to an outer diameter of the platen 102 to, in part, reduce uneven wear of the polishing pad 104. In some embodiments, the polishing system 100 further includes a pad conditioner assembly (not shown) that is used to abrade, rejuvenate, and remove polish byproducts or other debris from the surface of the polishing pad 104.

Polishing fluids, polishing fluid additives, cleaning fluids, and/or deionized (DI) water are delivered to a fluid dispense arm 114 positioned over the platen 102 from a polishing fluid source 126 and are dispensed onto the polishing pad 104 using nozzles 116 positioned in or on the fluid dispense arm 114. The fluid dispense arm 114 is coupled to an actuator 118, which positions the fluid dispense arm 114 over the platen 102 by swinging the fluid dispense arm 114 over the platen 102 when in use. The actuator 118 is disposed on a base plate 120 that surrounds the platen 102. A system controller 300, as discussed further below, controls the actuator 118 and the amount of polishing fluid that is dispensed by the fluid dispense arm 114 onto the polishing pad 104.

The fluid dispense arm 114 may dispense acidic polishing fluids, caustic polishing fluids, fluids containing metals, deionized water, or one or more other fluids for polishing the substrate 108. Additionally, as the substrate 108 disposed on the platen 102 is polished, materials from the surface of the substrate 108 that is in contact with the pad 104 may become suspended and/or carried away by the polishing and/or cleaning fluid. The material being removed from the substrate 108 may include metals or other materials that become entrained in the waste fluid and requires environmental considerations for reporting and/or disposal. For example, the waste fluid may require abatement, disposal as a hazardous material, or recycled and reused. The waste collection system 200 discussed below is uniquely configured to handle the variety of different materials present in the waste polishing fluid. The waste polishing fluid is also referred herein as spent polishing fluid.

The catch basin 122 collects the spent polishing fluid, which was spun radially outward from the rotating polishing pad 104 due to the centrifugal force. The catch basin 122 surrounds the platen 102 which enables substantially all of the spent polishing fluid flowing radially outward from the surface of the polishing pad 104 to be directed into the catch basin 122. The spent polishing fluids are removed from the catch basin 122 by a system drain 124. The system drain 124 may use gravity or a suction pump to remove the spent polishing fluids from the catch basin 122. The system drain 124 is connected to a waste collection system, which is further detailed below with respect to FIG. 2.

Figure 2:
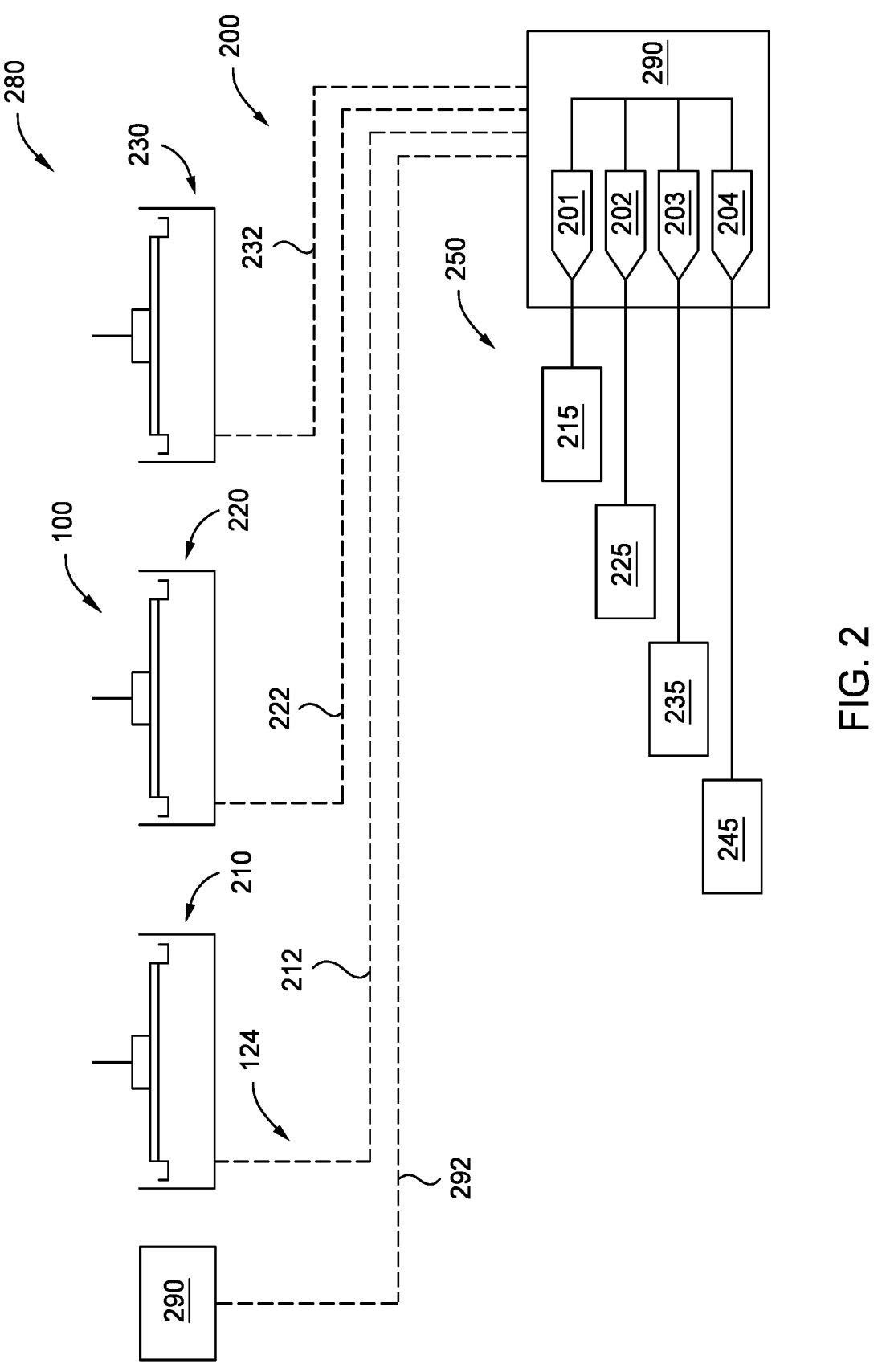
FIG. 2 is a schematic diagram of a waste collection system that may be used with the drain of the processing system, according to embodiments.

FIG. 2 is a schematic diagram of a waste collection system 200 that is connected to the system drain 124 of a CMP system 280, according to embodiments. The CMP system 280 may have one or more CMP(s) 100. For example, CMP system 280 may include a first CMP table 210, a second CMP table 220, and a third CMP table 230. Each CMP table 210, 220, 230 may be configured as a single CMP 100 as described above, or as another suitable system.

The waste collection system 200 may alternatively be used to manage waste flows from other types of systems. The waste collection system 200 is gravity feed from the system drain 124. Alternately, the waste collection system 200 may include one or more vacuum devices configured to pull the waste fluids from the system drain 124 and into the waste collection system 200.

The waste collection system 200 may be coupled to one or more CMP systems 280 or other similar systems. For example, waste collection system 200 may be coupled to the first CMP table 210, the second CMP table 220, and the third CMP table 230. The waste collection system 200 may additionally include a post-CMP substrate cleaner 290. Although not shown, the cleaner 290 includes rinse tanks and/or scrubbers for removing residual polishing fluid and/or material from the substrate 108 after a CMP process has been performed on the substrate 108 at one or more of the CMP tables 210, 220, 230. Each table 210, 220, 230 has a respective system drain 124. In FIG. 2, the system drain 124 of the first CMP table 210 is coupled to a drain line 212, the system drain 124 of the second CMP table 220 is coupled to a drain line 222, and the system drain 124 of the third CMP table 230 is coupled to a drain line 232. Additionally, the system drain 124 of the rinse tanks and/or scrubbers of the cleaner 290 is coupled to a drain line 292.

The waste collection system 200 has one more valve boxes 290. The drain lines 212, 222, 232, 292 of each CMP table 210, 220, 230 and the cleaner 290 may have a respective valve box 290. Alternately, two or more of the drain lines 212, 222, 232, 292 may be coupled to the same valve box 290. The valve boxes 290 includes a plurality of valves to separate incoming waste fluid from the drain lines 212, 222, 232, 292 to a selected one of a plurality of drains 250. The plurality of drains 250 includes fluid drains 215, 225, 235, 245. For example, a first valve 201 may direct waste fluid coming into the valve box 290 from one of the drain lines 212, 222, 232, 292 to the first fluid drain 215. A second valve 202 may direct waste fluid coming from one of the drain lines 212, 222, 232, 292 into the valve box 290 to the second fluid drain 225. A third valve 203 may direct waste fluid coming from one of the drain lines 212, 222, 232, 292 to the valve box 290 to the third fluid drain 235. In addition, a fourth valve 204 may direct waste fluid coming from one of the drain lines 212, 222, 232, 292 to the valve box 290 to the fourth fluid drain 245. Thus, all CMP tables 210, 220, 230 and the cleaner 290 may be selective connected to all four different fluid drains 215, 225, 235, 245 by the valve box 290.

Each fluid drain 215, 225, 235, 245 is configured to handle a specific waste stream. For example, fluid drain 1 (FD1) 215 may be designated to handle acidic waste free of metals, such as arsenic (As). Fluid drain 2 (FD2) 225 may be designated to handle caustic waste free of metals, such as arsenic (As). Fluid drain 3 (FD3) 235 may be designated to handle acidic waste having metals, such as arsenic (As). Fluid drain 4 (FD4) 245 may be designated to handle caustic waste having metals, such as arsenic (As). In this manner, the waste stream to each fluid drain 215, 225, 235, 245 may be characterized, abated, and/or disposed as necessitated by the particular waste. Additionally, each fluid drain 215, 225, 235, 245 may be metered for reporting or other purposes. Thus, in operation similar waste fluid from all the tables 210, 220, 230 and the cleaner 290 may be collected in a common and appropriate one of the plurality of drains 250

Figure 3:
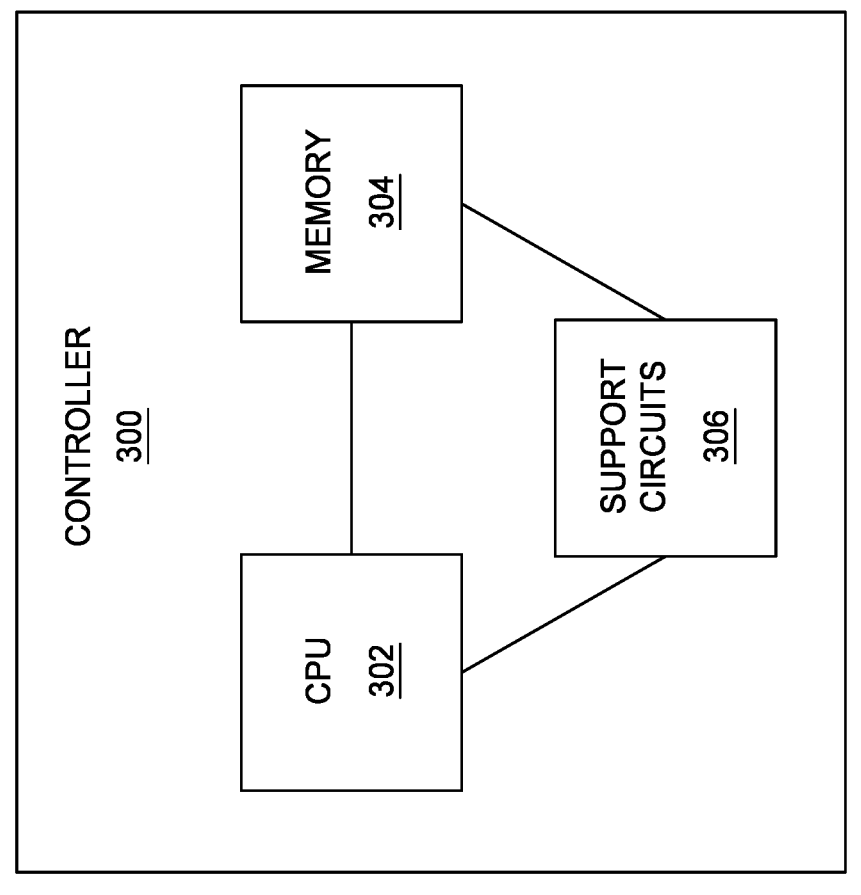
FIG. 3 is a schematic diagram of a controller unit configured to control the processing system and waste collection systems, according to embodiments.

Referring to FIG. 3, is a schematic diagram of a system controller 300 configured to control the waste collection system 200. The system controller 300 may control or be in communication with a portion of the fabrication facility. The system controller 300 communicates with the polishing system 100 and the waste collection system 200. The system controller 300 includes a programmable central processing unit, such as the CPU 302, which is operable with a memory 304 (e.g., non-volatile memory) and support circuits 306. The support circuits 306 are conventionally coupled to the CPU 302 and comprise cache, clock circuits, input/output subsystems, power supplies, and the like. The combinations thereof are coupled to the various components of the polishing system 100. The CPU 302 is one of any form of general purpose computer processor used in an industrial setting, such as a programmable logic controller (PLC), for communicating with various components and sub-processors of the polishing system 100. The memory 304, coupled to the CPU 302, is non-transitory and is typically one or more of readily available memories such as random access memory (RAM), read only memory (ROM), floppy disk drive, hard disk, or any other form of digital storage, local or remote.

The memory 304 is in the form of a computer-readable storage media containing instructions (e.g., non-volatile memory), which, when executed by the CPU 302, facilitates the operation of the polishing system 100. The instructions in the memory 304 are in the form of a program product such as a program that implements the methods of the present disclosure. The CPU 302 is further configured to include sensors and machine learning capabilities. The sensors of the CPU 302 may be configured to characterize polishing fluid waste, such as pH levels, oxygen levels, and nitric acid levels, among others. The machine learning capabilities are capable of optimizing the drain 250 switching based on waste characterization and processing recipe.

The memory 304 is configured to store a plurality of instructions for running operations on the polishing system 100 and the waste collection system 200. For example, the memory 304 can hold instructions of a first polishing recipe for providing the polishing fluid for removing a layer of material on the substrate. The memory 304 can hold instructions that designate the material of the substrate as well as the fluids used during processing. The memory 304 can hold information of the flow of the first and a second polishing fluid for when to change from the first polishing fluid to the second polishing fluid or vice versa. The memory may hold instructions for characterizing the fluid waste and controlling the waste collection system 200. In addition, the memory 304 can hold instructions for how to handle waste fluid collection in the event of a power or instrument connectivity failure.

The program code may conform to any one of a number of different programming languages. In one example, the disclosure may be implemented as a program product stored on computer-readable storage media for use with a computer system. The program(s) of the program product define functions of the embodiments (including the methods described herein).

Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure. In some embodiments, the methods set forth herein, or portions thereof, are performed by one or more application specific integrated circuits (ASICs), field-programmable gate arrays (FPGAs), or other types of hardware implementations. In some other embodiments, the polishing pad manufacturing methods set forth herein are performed by a combination of software routines, ASIC(s), FPGAs and, or, other types of hardware implementations.

The controller 300 may perform the selection for the appropriate one of the plurality of drains 250 for a particular waste fluid. The controller 300 may monitor the tables 210, 220, 230 and the cleaner 290 for the particular fluid being used as well as the material being polished/cleaned. For example, the controller 300 may monitor a polishing recipe run by the CMP 100 to correctly connect the appropriate fluid drain 215, 225, 235, 245 to each table 210, 220, 230 and the cleaner 290. It should be appreciated that each table 210, 220, 230 and the cleaner 290 is connected to one of the fluid drain 215, 225, 235, 245 corresponding to the waste fluid and as such, more than one table 210, 220, 230 and the cleaner 290 may be coupled to the same drain 250. In operation, the controller 300 sets forth the instructions for polishing substrates on the CMP 100 and collecting the fluid wastes with the waste collection system 200.

Referring to FIG. 4, FIG. 4 is a flow diagram setting forth a method of collecting waste fluid from the CMP 100 in the waste collection system 200. A substrate is introduced into a CMP 100 for polishing. The substrate is placed on the polishing pad of the CMP system. The substrate may have an associated recipe stored in a controller. The recipe provides instructions for removing all or portions of a material layer of the substrate by the CMP system. The recipe may be unique to the substrate, a group of substrates, or the operation. At operation 410, the controller monitors a processing fluid dispensed into a processing system of the fabrication facility in accordance to a processing recipe for processing a material on a part. For example, a first polishing fluid is dispensed onto a surface of a polishing pad. A controller directs the first polishing fluid of one or more polishing or cleaning fluids to be introduced into the processing system through the fluid dispense arm for polishing and or cleaning the substrate. The polishing fluid may be acidic or caustic. The polishing fluid may additionally contain metalloids, such as arsenic, or other materials useful for removing material from the substrate while polishing.

At operation 420, the controller monitors the processing fluid from the processing system removed as a waste fluid. For example, during polishing the substrate is urging against the surface of the polishing pad while rotating a platen, the platen having the polishing pad disposed thereon. The first polishing fluid aids in the removal of material from the surface of the substrate. The spent polishing fluid may contain particles removed from the substrate during polishing. The spent, or waste, polishing fluid, is carrying impurities removed from the substrate such as metals, such as cobalt, molybdenum, titanium, etc., or silicon containing material among other impurities. The waste polishing fluid with the impurities is removed via a drain from the CMP.

At operation 430, the controller directs the collection of the waste fluid using a waste collection system. The waste collection system includes a valve box coupled to two or more facility drains. The controller is configured to operate each valve in teh valve box between an open and a closed state. Spent polishing fluid is removed from the polishing system via a drain of the processing system which is coupled to the valve box. The valve box has a first valve of multiple valves wherein each valve is uniquely coupled to a separate facility drain.

At operation 440, the characterization of the fluid waste removed from a substrate processing system, the waste fluid collected via a waste collected system coupled to a plurality of facility drains is determined. The controller may determine the characterization of the waste fluid based on the polishing fluid and the material removed from the substrate. The characterization may be determined by extracting information from the polishing recipe for the substrate. Alternately, the spent polishing fluid may be analyzed with sensors for detecting pH and/or other chemical properties of the spent polishing fluid.

For example, the controller may monitor the slurry type. The slurry may have may assigned a numeric code such as 1 for an acid metal, 2 for a base metal, 3 acid nonmetal and 4 for a base nonmetal. The slurry may additionally be assigned a 0 for chemistries not otherwise categorized such as deionized water. The flow for each of the slurry materials is monitored along with a state of the cleaner/CMP. For example, the CMP may be processing, paused, stopped, in a failed state or idle.

Additionally, the slurry waste fluid may contain particles removed from the substrate. For example, copper, ozone, solids, fluoride, toxics (GaAs) etc. The polishing operation for the removal of the material layer is provided in a recipe to the CMP/cleaner. The controller can then determine the characterization of the slurry waste that would be entering the CMP drain by knowing the slurry used and the material removed from the substrate.

At operation 450, the waste fluid is directed by the controller to a first valve in the valve box coupled to a first facility drain in response to determining the characterization of the fluid waste. The controller may operate one or more values in the valve box to open the first valve while closing the remaining valves. The spent waste fluid is directed through the first valve to a first facility drain of the multiple facility drains based on a characterization of the waste fluid. For example, a waste fluid characterized as caustic metal would be directed to a facility drain suitable for collecting caustic metal waste. Similarly, a waste fluid characterized as acidic metal would be directed to a facility drain suitable for collecting acidic metal waste.

The facility drains are each configured to accept specific waste types. The first facility drain is configured to accept all waste fluid of a specific characterization, for example, a caustic waste having metals. In this manner, only similar wastes are collected in the same facility drain. For example, the controller may operate the valves to specific drains based on chemistry, pH, and particles as shown here in Table 1:

| | Slurry/Chem | | Particle material | Facility Drain |
| --- | --- | --- | --- | --- |
| A | Slurry type S1: ANJI, G100 | pH: 12.5-13.8 | aluminum oxide | FD1 |
| C | Slurry type S2: Eminess, UltraSol 2EX | pH: 10-11 | silicon dioxide | FD1 |
| B | Slurry type S3: Dow, Klebosol 1630 | pH: 10-11 | silicon dioxide | FD1 |
| D | Slurry type S4: Cabot, iDIEL D9228 | pH: 4-5 | silicon dioxide | FD4 |
| E | Slurry type S5: Fujimi, Planerlite 4217 | pH: 11 | silicon dioxide | FD3 |
| F | Slurry type S6: Fujimi, DSH101 | pH: 10-11 | silicon dioxide | FD3 |
| | Cleaner solution type Z1: Saint-Gobain, Amber Clean 527D | pH: 11.5 | NA | FD3 |
| | Cleaner solution type Z2: Ammonium hydroxide | pH: 10-13 | NA | FD3 |

A reaction and delay time may be providing in the switching of the valves to different facility drains to prevent waste fluid of a different, or less dangerous, characterization from going to a wrong drain. For example, the controller may operate the valves to direct an acidic waste fluid having a semi-metalloid such as arsenic to the proper drain earlier than the waste fluid is anticipated to reach the valve box, and to similarly keep the valve configured to direct fluid to the facility drain for a small period of time afterwards the fluid has stopped dispensing on the CMP to ensure all the waste is collected.

The controller may contain a default operation specifying a default facility drain. For example, the facility drain FD4, configured as an acidic metal containing drain, may be used during commination loss with tool. In this manner, the unknown characterization of the waste fluid is treated most stringently and is prevented from being inadvertently sent to recycling or reused in a manner that is harmful or otherwise hazardous.

The controller may further prepare reports for the quantity of waste entering the first facility drain; the second facility drain; the third facility; and the fourth facility drain. The reports can be provided for environmental compliance, waste reduction analysis or for other purposes.

Waste characteristics are getting very sophisticated for fabrication facilities. Advantageously, the apparatus and method described above provides a cost effective solution for waste management by allowing waste drain switching based on several characteristics of the waste and even providing a fail-safe solution. This enables drain material protection as well as cost effective control of subfab components, abatement (water flows, neutralization), and data management, estimation of waste composition and balancing of materials, which all enable cost reduction in treatment of the waste. Furthermore, the proper characterization of the waste provides a knowledge for safe handling of the waste by personnel. Material balance can be determined by tool and by chemical facility wide. Estimation of wastewater composition including comparison to sensors to detect drifts and other variations. This further enables the detection of unusual consumptions, e.g. by faulty valves or leaks While the foregoing is directed to embodiments of the present disclosure, other and further embodiments of the disclosure may be devised without departing from the basic scope thereof, and the scope thereof is determined by the claims that follow.

What is claimed is:

1. A system controller, the controller configured to control an operation of at least a portion of a fabrication facility, the system controller comprising:

a CPU configured to control the operation of at least a portion of the fabrication facility, the CPU in communication with:

a first processing system comprising:

a basin sized to capture a processing fluid dispensed within the processing system for processing a material on a part; and a first system drain disposed in the basin, wherein the first system drain is configured to collect the processing fluid as waste fluid after processing the part; and the CPU configured to control a waste collection system fluidly coupled to the first system drain, wherein the waste collection system comprises:

a first facility drain configured to accept waste fluids from the first system drain characterized by the controller as acidic containing metals;

a second facility drain configured to accept fluids from the drain characterized by the controller as caustic containing metals;

a third facility drain configured to accept fluids from the drain characterized by the controller as an acid not containing metals;

a fourth facility drain configured to accept fluids from the drain characterized by the controller as caustic not containing metals;

a valve box having two or more valves, the valve box configured to be coupled to the first system drain and the first through fourth facility drains, wherein each facility drain is uniquely coupled to one of the two or more valves; and wherein the CPU is configured operate the two or more valves between an open and a closed state in response to a characterization of the waste fluid entering the first system drain and the first facility drain is a default drain when communication is lost.

2. The system controller of claim 1, wherein the waste collection system has four facility drains coupled to a respective valve, each respective valve operable by the controller between an open and a closed state.

3. The system controller of claim 1, wherein the CPU is configured to operate:

a first valve between an open and a closed state coupling the first drain to the first facility drain;

a second valve between an open and a closed state coupling the first drain to the second facility drain;

a third valve between an open and a closed state coupling the first drain to the third facility drain; and a fourth valve between an open and a closed state coupling the first drain to the fourth facility drain.

4. The system controller of claim 1, CPU is further in communication with a second processing system configured similar to the first processing system and having a second system drain fluidly coupled to the waste collection system.

5. The system controller of claim 1, wherein the CPU is configured to characterize the waste fluid entering the first system drain and if the waste fluid is an acid containing a metal, the CPU operates to direct the waste fluid in only the first facility drain.

6. The system controller of claim 1, wherein the CPU is configured to characterize the fluid entering the first system drain and if the fluid is unable to be characterized, the CPU operates to direct the waste fluid in only the first facility drain.

7. A method of collecting waste fluid from a portion of a fabrication facility, the method comprising:

determining a characterization of the waste fluid removed from a substrate processing system, the waste fluid collected via a waste collected system coupled to a plurality of facility drains, wherein the plurality of facility drains further comprises:

a first facility drain of the plurality of facility drains configured to accept waste fluids characterized as acidic containing metals;

a second facility drain of the plurality of facility drains configured to accept waste fluids characterized as caustic containing metals;

a third facility drain of the plurality of facility drains configured to waste fluids characterized as an acid not containing metals; and a fourth facility drain of the plurality of facility drains configured to accept waste fluids characterized as an caustic not containing metals; and in response to determining the characterization of the fluid waste, having the controller direct the waste fluid to one of the first through fourth facility drains suitable for handling the waste fluid, wherein the first facility drain is a default drain when communication is lost with the substrate processing system.

8. The method of claim 7, wherein the fluid used in the recipe running on the substrate processing system and the material from a substrate carried off in the waste fluid after processing is used by the controller to determine the characterization of the waste fluid.

9. The method of claim 8, wherein the waste fluid that cannot be characterize is placed in the first facility drain.

10. The method of claim 8, further comprising:

directing the waste fluid to the first drain in a fail-safe condition, wherein the controller operates to open valves in a configuration that directs the waste fluid to the first facility drain.

11. The method of claim 7, further comprising:

reporting a quantity of fluid waste entering the first facility drain; the second facility drain; the third facility drain; and the fourth facility drain.

12. The method of claim 7, further comprising:

delaying a switching to a one or more facility drains to prevent waste fluid of a different, or less dangerous, characterization from going to a wrong drain.

13. A non-transitory computer readable storage medium comprising a program product which, when executed, is configured to cause a method for collecting waste fluid from a fabrication facility to be performed, the method comprising:

determining a characterization of the waste fluid removed from a substrate processing system, the waste fluid collected via a waste collected system coupled to a plurality of facility drains, wherein the plurality of facility drains further comprises:

a first facility drain of the plurality of facility drains configured to accept waste fluids characterized as acidic containing metals;

a second facility drain of the plurality of facility drains configured to accept waste fluids characterized as caustic containing metals;

a third facility drain of the plurality of facility drains configured to waste fluids characterized as an acid not containing metals; and a fourth facility drain of the plurality of facility drains configured to accept waste fluids characterized as an caustic not containing metals; and in response to determining the characterization of the fluid waste, having the controller direct the waste fluid to one of the first through fourth facility drains suitable for handling the waste fluid, wherein the first facility drain is a default drain when communication is lost with the substrate processing system.

14. The non-transitory computer readable storage medium of claim 13, wherein the fluid used in the recipe running on a substrate processing system and the material from a substrate carried off in the waste fluid after processing determines the characterization of the waste fluid.

15. The non-transitory computer readable storage medium of claim 14, wherein the waste fluid that cannot be characterize is placed in the first facility drain.

16. The non-transitory computer readable storage medium of claim 14, further comprising:

directing the waste fluid to the first drain in a fail-safe condition, wherein the controller operates to open valves in a configuration that directs the waste fluid to the first facility drain.

17. The non-transitory computer readable storage medium of claim 13, further comprising:

reporting a quantity of fluid waste entering the first facility drain; the second facility drain; the third facility drain; and the fourth facility drain.

* * * * *